US007536511B2

United States Patent
Thompson

(10) Patent No.: US 7,536,511 B2
(45) Date of Patent: May 19, 2009

(54) CPU MODE-BASED CACHE ALLOCATION FOR IMAGE DATA

(75) Inventor: Stephen Patrick Thompson, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 378 days.

(21) Appl. No.: 11/482,454

(22) Filed: Jul. 7, 2006

(65) Prior Publication Data
US 2008/0007561 A1    Jan. 10, 2008

(51) Int. Cl.
*G06F 13/00*    (2006.01)
(52) U.S. Cl. .................. 711/130; 345/534; 345/535
(58) Field of Classification Search ............. 711/130
See application file for complete search history.

(56) References Cited

U.S. PATENT DOCUMENTS

| 6,035,349 | A * | 3/2000 | Ha et al. ........................ 710/68 |
| 6,963,987 | B1 * | 11/2005 | Emons ............................ 713/324 |
| 2001/0049771 | A1 * | 12/2001 | Tischler et al. ............... 711/133 |
| 2002/0116576 | A1 | 8/2002 | Jagannath et al. |
| 2005/0134588 | A1 * | 6/2005 | Aila et al. .................... 345/426 |

FOREIGN PATENT DOCUMENTS

WO    0139164 A    5/2001

OTHER PUBLICATIONS

PCT International Search Report, PCT/US2007/015374, Jan. 18, 2008, 2 pages.

* cited by examiner

*Primary Examiner*—Kee M Tung
*Assistant Examiner*—David H Chu

(57) ABSTRACT

An apparatus includes a central processing unit having an output to provide a status indicator, a graphics controller having an output coupleable to a display interface, a cache comprising a plurality of cache lines, and memory controller having an input to receive the status indicator. The memory controller is configured to disable allocation of cache lines of the cache for cache misses for data requests from the graphics controller in response to the status indicator indicating the central processing unit is in an active mode. The memory controller further is configured to enable allocation of cache lines of the cache for cache misses for data requests from the graphics controller in response to the status indicator indicating the central processing unit is in an idle mode.

18 Claims, 3 Drawing Sheets

US 7,536,511 B2

CPU MODE-BASED CACHE ALLOCATION FOR IMAGE DATA

FIELD OF THE DISCLOSURE

The present disclosure relates generally to data processing and more particularly to data caching.

BACKGROUND

Many electronic devices utilize a display to visually relay information to a user. Conventional devices typically store the image data in system memory or graphics memory external to the display controller used to control the display. As a result, at each display refresh, external memory accesses are required to access the image data from the external memory and provide it to the display controller for processing. In many instances, however, the displayed image is refreshed infrequently, if at all, while the device is idle. To illustrate, cellular telephones often display a digital clock image with a signal strength icon when the phone is not in use for a voice call, where the digital clock image typically only changes, and therefore refreshed, only when a minute has elapsed (thereby changing the displayed time) or the signal strength changes (thereby changing the signal strength icon). Accordingly, the process of accessing image data from an external memory during idle periods when the image changes infrequently, if at all, typically results in unnecessary power consumption and a decrease in processing performance. Accordingly, an improved technique for accessing data representative of an image to be displayed would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
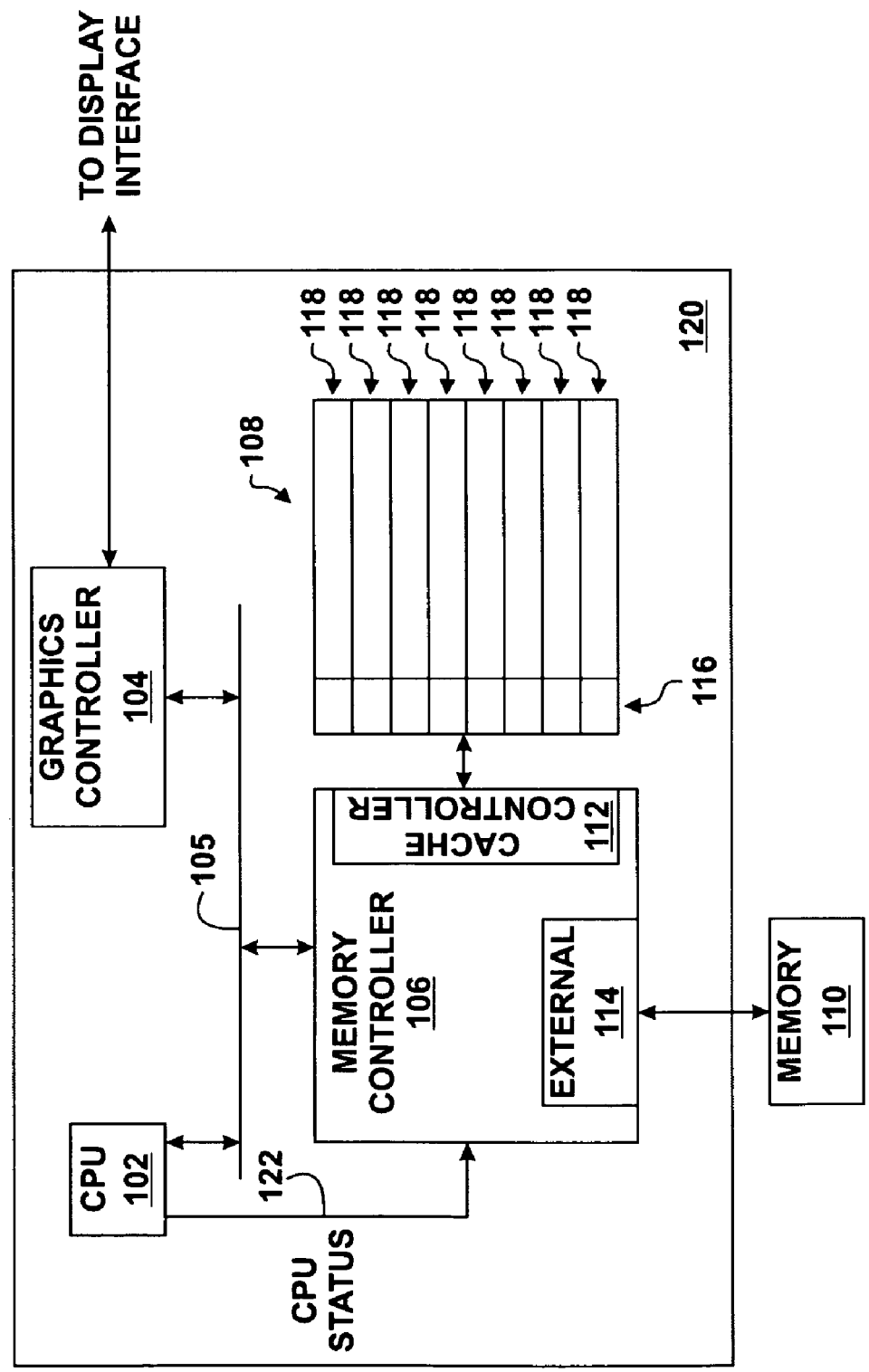
FIG. 1 is a block diagram illustrating an exemplary processing device utilizing a cache for storing data for both a central processing unit (CPU) and a graphics controller in accordance with at least one embodiment of the present disclosure.

The following description is intended to convey a thorough understanding of the present disclosure by providing a number of specific embodiments and details involving display refreshing using a cache shared between a CPU and a graphics controller. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method includes disabling allocation of cache lines of a cache for cache misses resulting from data requests from a graphics controller of a processing device during an active mode of a central processing unit of the processing device. The method further includes enabling allocation of cache lines of the cache for cache misses resulting from data requests from the graphics controller during an idle mode of the central processing unit.

In accordance with another aspect of the present disclosure, a method includes configuring a central processing unit of a processing device to be in an idle mode during a first duration and configuring the central processing unit to be in an active mode during a second duration, the second duration subsequent to the first duration. The method further includes determining a cache miss for a first data request from a graphics controller during the second duration, accessing a first data from a location of a memory associated with the first data request, and providing the first data to the graphics controller without allocating a cache line of the cache for the first data. The method additionally includes determining a cache miss for a second data request from the graphics controller during the first duration, accessing a second data from a location of the memory associated with the second data request, allocating a cache line for the second data, and providing the second data to the graphics controller.

In accordance with yet another aspect of the present disclosure, an apparatus includes a central processing unit having an output to provide a status indicator, a graphics controller having an output coupleable to a display interface, a cache comprising a plurality of cache lines, and memory controller having an input to receive the status indicator. The memory controller is configured to disable allocation of cache lines of the cache for cache misses for data requests from the graphics controller in response to the status indicator indicating the central processing unit is in an active mode. The memory controller further is configured to enable allocation of cache lines of the cache for cache misses for data requests from the graphics controller in response to the status indicator indicating the central processing unit is in an idle mode.

FIGS. 1-4 illustrate exemplary techniques for sharing a cache between a CPU and a graphics controller so as to reduce power consumption and increase processing performance. A memory controller monitors the state of the CPU and manages cache line allocation for the CPU and the graphics controller based on the CPU state. When the CPU is in an active mode, cache line allocation is enabled for the CPU and disabled for the graphics controller. Accordingly, while the CPU is in an active mode, data requests from the graphics controller that hit the cache are serviced from the cache, but cache misses for data requests from the graphics controller are serviced from memory with no cache lines allocated in the cache for the cache miss. In contrast, when the CPU is in an idle mode, cache line allocation is enabled for the graphics controller so that cache misses for data requests from the graphics controller are allocated cache lines in the cache. Accordingly, in one embodiment, image data representing at least a portion of an image to be displayed during CPU idle periods can be stored in the cache and accessed by the graphics controller in response to display refresh requests, thereby reducing or eliminating external memory accesses by the graphics controller during CPU idle periods, which reduces the power consumption of the device during CPU idle periods.

FIG. 1 illustrates an exemplary processing device 100 in accordance with at least one embodiment of the present disclosure. In one embodiment, the processing device 100 includes a portable device utilizing a battery for a power source, such as a cellular phone, a personal digital assistant, a notebook computer, and the like. The processing device 100 includes a central processing unit (CPU) 102, a graphics controller 104, a system bus 105, a memory controller 106, a cache 108 (e.g., a level 2, or L2, cache), and a memory 110, wherein the CPU 102, the graphics controller 104 and the memory controller 106 are connected via the system bus 105 or other connections. The memory controller 106 includes a cache controller 112 to manage the cache 108 and an external memory controller 114 to manage the memory 110. The cache 108 includes, for example, a tag array 116 and a plurality of cache lines 118, each cache line 118 corresponding to an entry of the tag array 116. The cache 108 can include, for example, a direct-mapped cache or a set-associative cache. In one embodiment, the CPU 102, the graphics controller 104, the memory controller 106 and the cache 108 are implemented together on a single integrated circuit 120 whereas the memory 110 is external to the integrated circuit (e.g., external random access memory (RAM)). The integrated circuit 120 can include, for example, a microprocessor, a microcontroller, an application specific integrated circuit (ASIC), a system on a chip (SOC) and the like.

The CPU 102 includes an output to provide a CPU status indicator 122 that indicates whether the CPU is in an active mode or in an idle mode (e.g., having an asserted value to indicate active mode and an unasserted value to indicate an idle mode). As used herein, an idle mode is a mode in which the CPU is halted or suspended and is not issuing data requests that potentially would be serviced by the cache 108. Correspondingly, as used herein, an active mode is a mode in which the CPU is executing program instructions and can issue or is issuing data request that potentially would be serviced by the cache 108.

The memory controller 106 includes an input to receive the CPU status indicator 122 so as to configure the cache controller 112 to enable or disable cache line allocations for the graphics controller 104 in response to the CPU mode indicated by the CPU status indicator 122. In instances where the CPU status indicator 122 indicates that the CPU is in an idle mode, the memory controller 106 configures the cache controller 112 to enable cache line allocations for cache misses for data requests from either of the graphics controller 104 or the CPU 102. In instances where the CPU status indicator 122 indicates that the CPU is in an active mode, the memory controller 106 configures the cache controller 112 to disable cache line allocations for cache misses for data requests from the graphics controller 104.

In one embodiment, data used by the CPU during operation (hereinafter, "CPU data") and image data used by the graphics controller to drive a display device via a display interface is initially stored in the memory 110. During data requests submitted by the CPU 102, a portion of the CPU data is stored at corresponding cache lines 118 of the cache 108. Further, when the CPU is in an idle mode, cache line allocation is enabled for the graphics controller 104 and a portion of the image data may be stored at corresponding cache lines 118 of the cache 108 (potentially overwriting CPU data in the cache 108) as a result of data requests by the graphics controller 104 during an idle period. Accordingly, any subsequent requests for image data already in the cache 108 by the graphics controller 104 can come from the cache 108, rather than requiring an external access to the memory 110, thereby reducing the power consumption for the data access as cache accesses typically require less power than memory accesses. Further, in one embodiment, the cache controller 112 is configured to permit each cache line to be allocated to image data for the graphics controller 104 only a certain number of times (e.g., only once) to prevent cache thrashing by the graphics controller 104. The effect of this mode-based cache line allocation policy is that while the CPU is idle, the amount of image data stored in the cache 108 will gradually increase. In the event that the CPU is idle for a sufficient period of time and the image data used to represent the entire displayed image is small enough to be stored entirely by the cache 108, the graphics controller 104 eventually will be able to refresh the display entirely from the cache 108 and therefore avoid accesses to the memory 110. When the CPU exits the idle mode (due to, for example, an interrupt such as a timer or a keystroke), the cache 108 is configured so that cache lines are only allocated for data requests from the CPU 102 so that some or all of the image data in the cache 108 is gradually replaced with CPU data.

In order to implement enablement and disablement of cache lines, the cache controller 112, in one embodiment, utilizes a set of flip-flops, one for each cache line, that are used to indicate whether the corresponding cache lines can be allocated to the graphics controller 104 such that when a flip-flop has a first value, e.g., zero (0), allocation of the corresponding cache line to the graphics controller 104 is disabled and when a flip-flop has a second value, e.g., one (1), allocation of the corresponding cache line to the graphics controller 104 is enabled. Accordingly, when the CPU status indicator 122 indicates that the CPU 102 is in an active mode, the cache controller clears each flip-flop to zero (0) and thereby disabling cache line allocation for the graphics controller 104. When the CPU status indicator 122 indicates that the CPU 102 has entered an idle mode, the cache controller 112 sets each flip-flop to one (1), thereby initially enabling each cache line to be allocated to the graphics controller 104. Further, as noted above, the cache controller 112 can permit each cache line to be allocated to the graphics controller 104 only a predetermined number of times (e.g., only once) during any given idle period of the CPU 102. Accordingly, as a cache line is allocated for the graphics controller 104, the flip-flop for that line is cleared to zero (0) so the cache line cannot be re-allocated to the graphics controller 104 for a different requested data. As a result, a displayed image represented by image data larger than the cache 108 does not cause the graphics controller 104 to "thrash" the cache 108 and nullify benefits of using the cache to store a portion of the graphics data.

Figure 2:
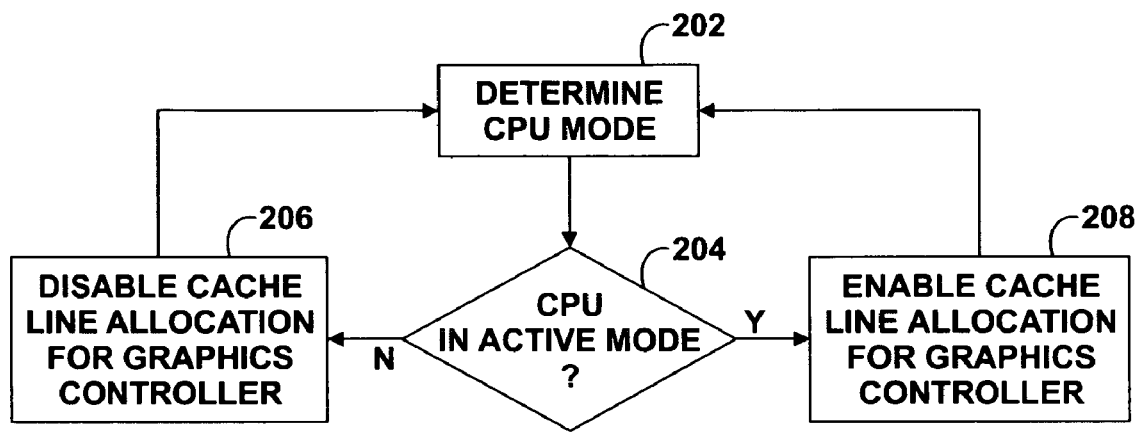
FIG. 2 is a flow diagram illustrating an exemplary method for enabling and disabling cache line allocation based on a mode of a CPU in accordance with at least one embodiment of the present disclosure.

FIG. 2 illustrates an exemplary method 200 for CPU mode-based cache allocation in accordance with at least one embodiment of the present disclosure. At block 202, the method 200 includes determining the current mode, idle or active, of a CPU (e.g., CPU 102 of FIG. 1). In one embodiment, the mode of the CPU can be determined based on a status indicator output by the CPU when it is placed in an idle state by the operating system. At block 202, the method 200 includes determining if the CPU mode is in an active mode. If so, the method 200 includes disabling cache line allocation for a graphics controller (e.g., graphics controller 104, FIG. 1) so that subsequent cache misses by the graphics controller do not result in the allocation of a cache line for the requested data after it is accessed from memory at block 204. Otherwise, if the CPU is in an idle mode, the method 200 includes enabling cache line allocation for the graphics controller so that subsequent cache misses by the graphics controller result in the allocation of a cache line for the requested data after being access from memory at block 206.

Figure 3:
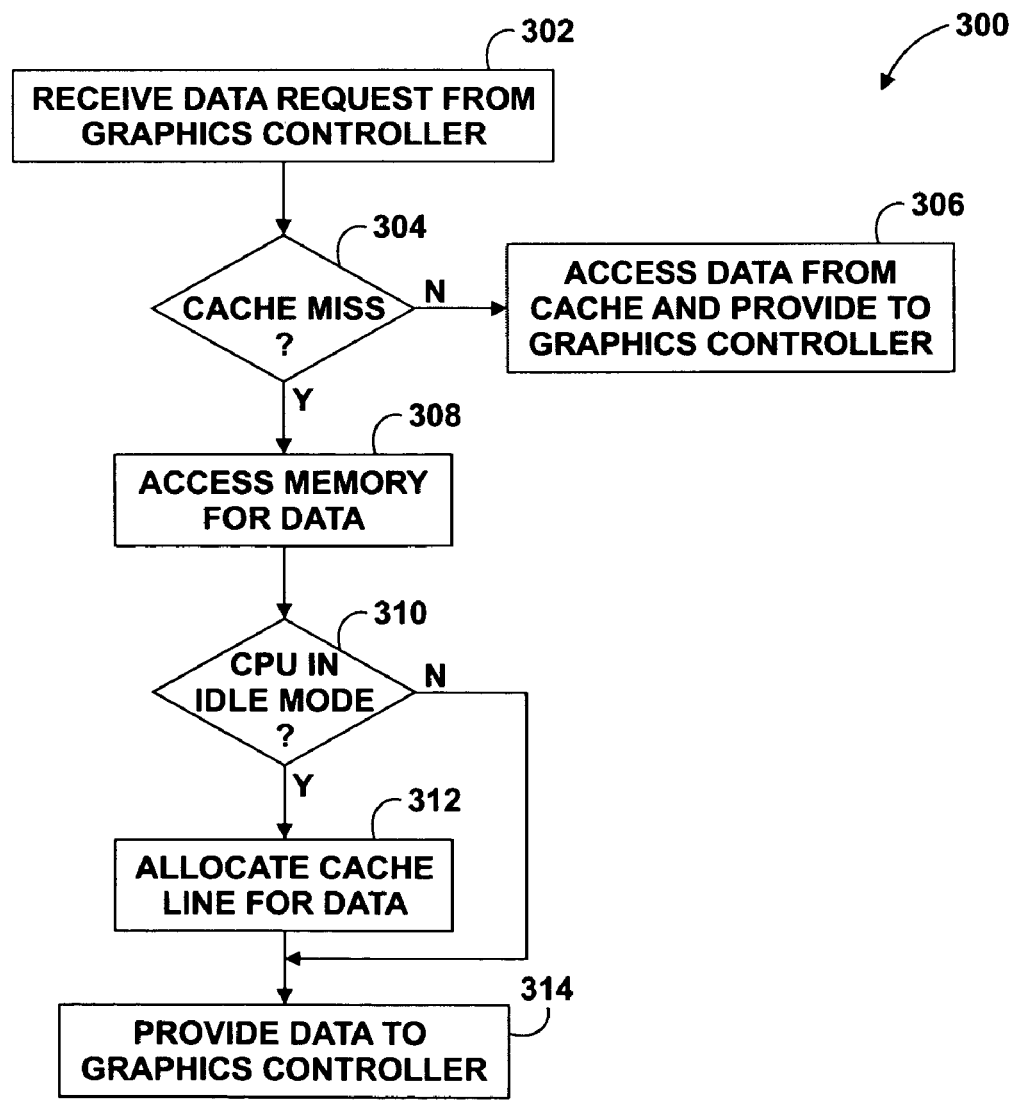
FIG. 3 is a flow diagram illustrating an exemplary method for processing a data request from a graphics controller in accordance with at least one embodiment of the present disclosure.

FIG. 3 illustrates an exemplary method 300 for processing a data request from the graphics controller in accordance with at least one embodiment of the present disclosure. The method 300 includes receiving a data request from a graphics controller (e.g., graphics controller 104, FIG. 1) at block 302. The data request, in one embodiment, indicates a memory location (e.g., a memory address) that stores image data for processing by the graphics controller.

At block 304, the method 300 includes accessing a cache (e.g., cache 108, FIG. 1) to determine whether the cache currently stores the requested image data, such as by performing a cache tag lookup between a tag array (e.g., tag array 116, FIG. 1) of the cache and a corresponding portion of the memory address associated with the request. In the event of a cache hit (i.e., a cache line of the cache has the requested image data), the method 300 includes accessing the requested image data from the identified cache line and providing the accessed image data to the graphics controller at block 306. Otherwise, in the event of a cache miss (i.e., no cache line of the cache has the requested image data), the method 300 includes accessing memory (e.g., memory 110) to obtain the requested image data at block 308.

At block 310, the method 300 includes determining whether the CPU (e.g., CPU 102, FIG. 1) is in an idle mode. If so, at block 312 the method 300 includes allocating a cache line for the image data accessed from the memory and storing the image data the allocated cache line so that it will be available for subsequent data requests from the graphics controller. It will be appreciated that in some instances, the allocated cache line may have been storing CPU data, which is overwritten by the accessed image data. Further, in one embodiment, the allocation of the cache line is denied in the event that the number of times the particular cache line has already been allocated for other sets of image data has exceeded a predetermined threshold (e.g., one allocation). At block 314, the method 300 includes providing the requested image data to the graphics controller for processing for display.

Figure 4:
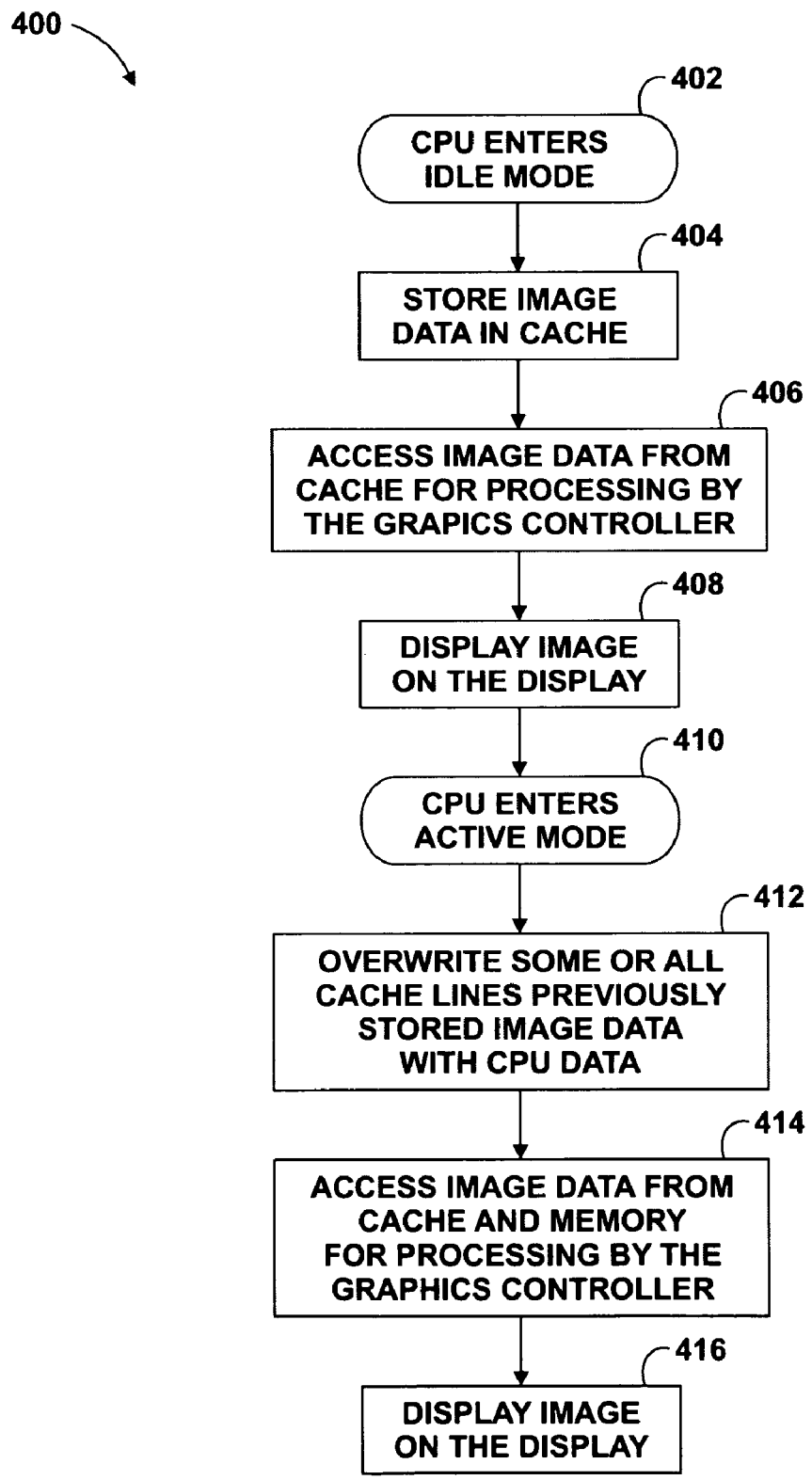
FIG. 4 is a flow diagram illustrating an exemplary method for refreshing a display in accordance with at least one embodiment of the present disclosure.

FIG. 4 illustrates an exemplary method 400 for utilizing a shared cache to cache image data for displaying an infrequently modified image during CPU idle times. At block 402, the CPU (e.g., CPU 102, FIG. 1) enters an idle mode, such as in response to a standby instruction from the operating system. In response, a cache (e.g., cache 108, FIG. 1) that is shared by the CPU and a graphics controller (e.g., graphics controller 104, FIG. 1) enables cache line allocation for the graphics controller. At block 404, the method 400 includes gradually storing image data representative of the infrequently modified image into the cache as a result of a sequence of cache misses and subsequent cache line allocations for data requests to obtain the image data. For purposes of illustration, assume that at the conclusion of block 404 the image data for the entire image has been stored in a corresponding set of cache lines of the cache. Accordingly, at block 406 the method 400 includes accessing the image data from the cache for processing and the graphics controller in response to a display refresh request. Because all of the image data for the displayed image is in the cache in this example, the refresh of the display can be serviced entirely by the cache without requiring external memory accesses, thereby reducing the power consumed in refreshing the display. At block 408, the method 400 includes displaying the resulting image on the display.

At block 410, the CPU enters an active mode and so cache line allocation for the graphics controller is disabled. Accordingly, the method 400 includes overwriting some or all of the cache lines that previously held image data with CPU data in response to cache misses for data requests from the CPU at block 412. However, in many instances, some of the cache lines may continue to contain image data. Accordingly, in response to a display refresh request, the method 400 includes accessing image data from the cache, an external memory, or both, for processing by the graphics controller at block 414. In this manner, some power savings can be achieved due to the ability to access at least some of the image data from the cache without requiring a memory access. At block 416, the resulting image generated by the graphics controller is provided for display.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    enabling access to a cache by a graphics controller during both an active mode and an idle mode of a central processing unit of a processing device;
    disabling allocation of cache lines of a cache for cache misses resulting from data requests from the graphics controller during the active mode; and
    enabling allocation of cache lines of the cache for cache misses resulting from data requests from the graphics controller during the idle mode.

2. The method of claim 1, further comprising:
    accessing a first data from the cache during the idle mode of the central processing unit;
    processing the first data at the graphics controller to generate a first image portion of a first image;
    accessing the first data from the cache and accessing a second data from a memory during the active mode of the central processing unit; and
    processing the first data and the second data at the graphics controller to generate a second image portion of a second image.

3. The method of claim 2, wherein accessing the second data from the memory comprises:
    determining a cache miss for a first data request from the graphics controller for the second data during the active mode of the central processing unit; and
    accessing the second data from the memory in response to the cache miss without allocating a cache line at the cache for the second data.

4. The method of claim 3, further comprising:
    determining a cache miss for a second data request from the graphics controller for the first data during the idle mode of the central processing unit; and
    accessing the first data from the memory in response to the cache miss for the second data request; and
    allocating a cache line at the cache for the first data; and
    wherein accessing the first data from the cache comprises accessing the first data from the cache subsequent to allocating the cache line at the cache for the first data.

5. The method of claim 1, further comprising:
    allocating a cache line at the cache for a first data in response to a first data request from the graphics controller for the first data during the idle mode; and providing a second data from a memory to the graphics controller without allocating a cache line in response to a cache miss resulting from a second data request from the graphics controller for the second data during the active mode.

6. The method of claim 5, further comprising:
allocating a cache line at the cache for a third data in response to a third data request from the central processing unit for the third data during the active mode.

7. A method comprising:
configuring a central processing unit of a processing device to be in an idle mode during a first duration;
configuring the central processing unit to be in an active mode during a second duration, the second duration subsequent to the first duration;
determining a cache miss for a first data request from a graphics controller during the second duration;
accessing a first data from a location of a memory associated with the first data request;
providing the first data to the graphics controller without allocating a cache line of a cache for the first data responsive to the central processing unit being in the active mode;
determining a cache miss for a second data request from the graphics controller during the first duration;
accessing a second data from a location of the memory associated with the second data request;
allocating a cache line for the second data responsive to the central processing unit being in the inactive mode; and
providing the second data to the graphics controller.

8. The method of claim 7, further comprising:
determining a cache hit for a third data request from the graphics controller during the second duration;
accessing a third data from a cache line of the cache associated with the cache hit; and
providing the third data to the graphics controller.

9. The method of claim 7, further comprising:
determining a cache miss for a third data request from the central processing unit during the second duration;
accessing a third data from a location of a memory associated with the third data request;
allocating a cache line of the cache for storing the third data; and
providing the third data to the central processing unit.

10. The method of claim 7, farther comprising:
accessing a third data from the cache for processing by the graphics controller to generate at least a portion of a first image; and
providing the first image for display.

11. The method of claim 10, further comprising:
accessing a fourth data from the cache during the second duration;
processing the fourth data at the graphics controller to generate a first portion of a second image;
accessing a fifth data from the memory during the second duration;
processing the fifth data at the graphics controller to generate a second portion of the second image; and
providing the first portion and the second portion of the second image for display.

12. The method of claim 7, wherein the processing device is an integrated circuit and wherein the memory is external to the integrated circuit.

13. The method of claim 7, wherein a cache line is allocated for data requested by the graphics controller up to a threshold number of allocations.

14. An apparatus comprising:
a central processing unit having an output to provide a status indicator;
a graphics controller having an output coupleable to a display interface;
a cache comprising a plurality of cache lines; and
a memory controller having an input to receive the status indicator, the memory controller configured to:
enable access to the cache by the graphics controller during both an idle mode and an active mode of the central processing unit;
disable allocation of cache lines of the cache for cache misses for data requests from the graphics controller in response to the status indicator indicating the central processing unit is in the active mode; and
enable allocation of cache lines of the cache for cache misses for data requests from the graphics controller in response to the status indicator indicating the central processing unit is in the idle mode.

15. The apparatus of claim 14, wherein a first data representative of a first image is stored in the cache during the idle mode of the central processing unit, and wherein the graphics controller is configured to access and process the first data from the cache for display during the idle mode.

16. The apparatus of claim 15, wherein a second data representative of a first portion of a second image is stored in the cache during the active mode of the central processing unit and a third data representative of a second portion of the second image is stored in a memory during the active mode, and wherein the graphics controller is configured to access and process the second data and the third data for display during the active mode.

17. The apparatus of claim 16, wherein the central processing unit and the graphics controller are implemented together at an integrated circuit and wherein the memory is external to the integrated circuit.

18. The apparatus of claim 14, wherein the apparatus comprises a portable device.

* * * * *

UNITED STATES PATENT AND TRADEMARK OFFICE
CERTIFICATE OF CORRECTION

| | | |
|---|---|---|
| PATENT NO. | : 7,536,511 B2 | |
| APPLICATION NO. | : 11/482454 | |
| DATED | : May 19, 2009 | |
| INVENTOR(S) | : Stephen Patrick Thompson | |

It is certified that error appears in the above-identified patent and that said Letters Patent is hereby corrected as shown below:

Column 7, Line 46, please change "farther comprising:" to --further comprising:--

Signed and Sealed this
Twenty-fifth Day of January, 2011

David J. Kappos
*Director of the United States Patent and Trademark Office*